United States Patent [19]

Yamakawa

[11] Patent Number: 4,682,135

[45] Date of Patent: Jul. 21, 1987

[54] ELASTIC SUPPORT MEMBERS FOR AN ELECTRIC ACTUATOR

[75] Inventor: Tsuyoshi Yamakawa, Fuwa, Japan

[73] Assignee: Teijin Seiki Company Limited, Osaka, Japan

[21] Appl. No.: 846,738

[22] Filed: Apr. 1, 1986

[30] Foreign Application Priority Data

Apr. 3, 1985 [JP] Japan ................... 60-70440

[51] Int. Cl.⁴ .............................. H01F 7/08
[52] U.S. Cl. .................... 335/256; 335/230; 335/274
[58] Field of Search ............... 335/229, 230, 256, 257, 335/258, 262, 266, 269, 274

[56] References Cited

U.S. PATENT DOCUMENTS

| | | | |
|---|---|---|---|
| 2,853,660 | 9/1958 | Immel | 335/274 X |
| 3,994,382 | 11/1976 | McIntosh | 335/274 X |
| 4,463,332 | 7/1984 | Everett | 335/274 X |
| 4,563,664 | 1/1986 | Chin et al. | 335/274 |

Primary Examiner—George Harris
Attorney, Agent, or Firm—Cushman, Darby & Cushman

[57] ABSTRACT

An electric actuator comprising a housing, a permanent magnet disposed within the housing, an axially movable armature disposed within the permanent magnet, an actuating coil supported by the housing for driving the armature to axially move, and an axially movable actuating rod fixedly connected to the armature, wherein the electric actuator further comprises a pair of elastic support members having radially inner end portions fixedly connected to the actuating rod and radially outer end portions fixedly connected to the housing, respectively.

1 Claim, 4 Drawing Figures

ELASTIC SUPPORT MEMBERS FOR AN ELECTRIC ACTUATOR

FIELD OF THE INVENTION

The present invention relates in general to an electric actuator and in particular to an electric actuator comprising an armature which is axially moved by actuating coils and which is supported by elastic support members.

SUMMARY OF THE INVENTION

In accordance with one importance aspect of the present invention, there is provided an electric actuator comprising a housing, a permanent magnet disposed within the housing, an axially movable armature disposed within the permanent magnet, an actuating coil supported by the housing for driving the armature to axially move, and an axially movable actuating rod fixedly connected to the armature, wherein the electric actuator further comprises a pair of elastic support members having radially inner end portions fixedly connected to the actuating rod at opposite end portions thereof adjacent the armature and radially outer end portions fixedly connected to the housing, respectively each of said elastic support members consisting of a plurality of thin leaves laminated one upon the other, each of said elastic support members being formed with a plurality of arm portions equiangularly spaced apart with respect to one another and radially extending between said radially inner and outer end portions and a plurality of generally triangular openings each disposed between two adjacent arm portions, each of said arm portions being axially deflected with respect to said radially inner and outer end portions of said elastic support member.

BRIEF DESCRIPTION OF THE DRAWINGS

The drawbacks of a prior art electric actuator and the features and advantages of an electric actuator according to the present invention will be more clearly understood from the following detailed description in conjunction with the annexed drawings in which.

DESCRIPTION OF THE PRIOR ART

Figure 4:
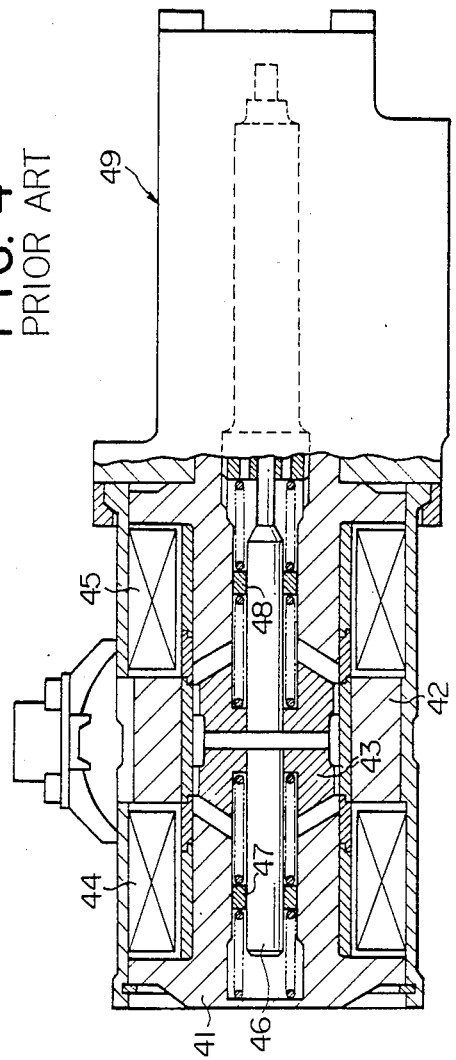
FIG. 4 is a longitudinal sectional view of an electric actuator of the prior art.

Referring to FIG. 4 of the annexed drawings, there is shown a known electric actuator comprising a housing 41, a cylindrical permanent magnet 42 disposed within the housing 41, an axially movable armature 43 disposed within the permanent magnet 42, a pair of actuating coils 44 and 45 disposed in both sides of the permanent magnet 42 and supported by the housing 41, and an valve actuating rod 46 connected to the armature 43. The valve actuating rod 46 is supported for axial movement by a pair of ball or roller bearings 47 and 48 received in axial bores formed in the housing 41, and is connected to a valve assembly 49. The armature 43 is caused to axially move by the actuating coils 44 and 45 when electrically connected to a power source. This axial movement of the armature 43 is transmitted through the valve actuating rod 46 to the valve assembly 49.

However, in such electric actuator, since it is difficult to concentrically position the permanent magnet 42 and the armature 43 by reason of accuracy of finishing, etc., the armature 43 is slightly offset from an center axis of the permanent magnet 42. A radial force is therefore exerted upon the armature 43 when magnetic lines of force generated by the permanent magnet 42 and the actuating coils 44 and 45 pass through the armature 43. Because of this radial force acting upon the armature 43, friction resistance become large between the valve actuating rod 46 and the bearings 47, 48 while the armature 43 is axially moving on and along the bearings 47 and 48. As a consequence, there is the problem that operating responsiveness of the armature 43 is reduced and a large energy loss occurs because of the friction resistance between the valve actuating rod 46 and the bearings 47, 48. Further, since the valve actuating rod 46 is in sliding or rolling engagement with the bearings 47 and 48, there is another problem that the valve actuating rod 46 is locked by the foreign substance caught in the bearings 47 and 48, and the mechanical hysteresis becomes large.

It is accordingly an important object of the present invention to prevent reduction in operating responsiveness of the armature and occurrence of a large energy loss.

Another object of the present invention is to prevent the actuating shaft from being locked and the mechanical hysteresis from becoming large.

DESCRIPTION OF THE PREFERRED EMBODIMENT

Figure 1:
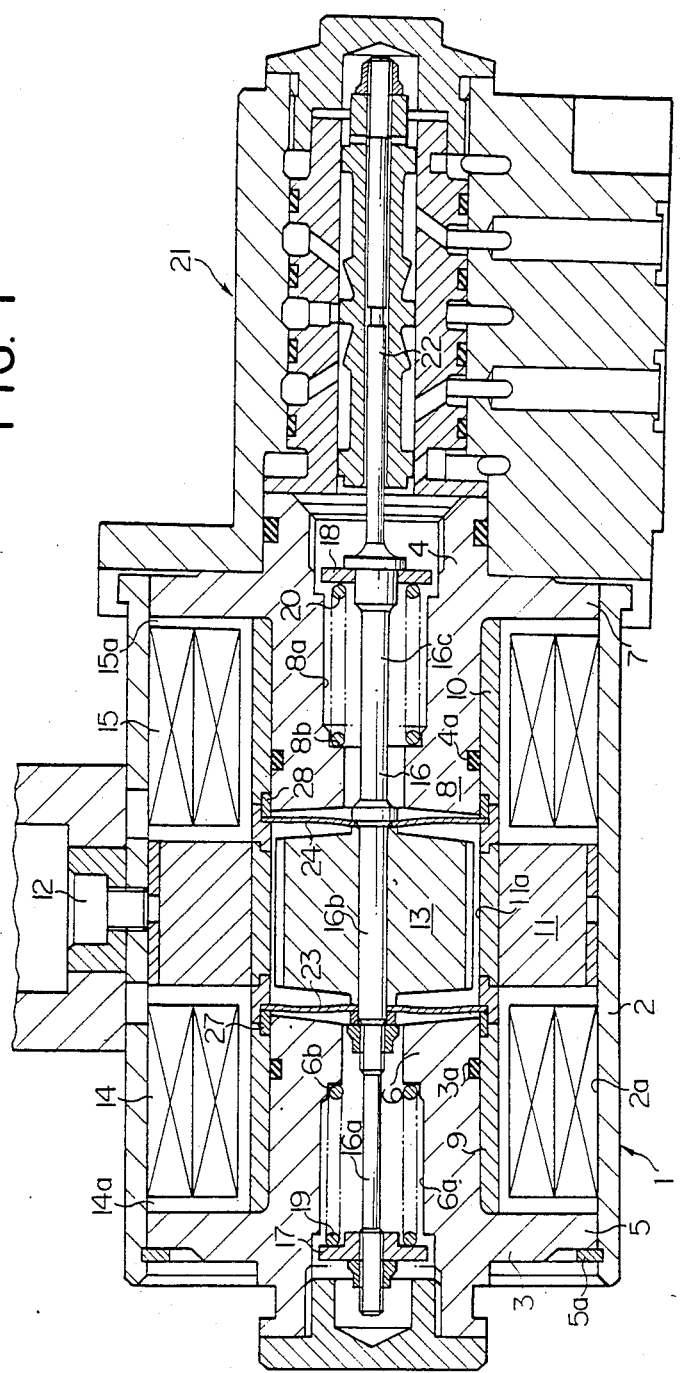
FIG. 1 is a longitudinal sectional view of an electric actuator constructed in accordance with the present invention.

Referring now to FIG. 1 of the annexed drawings, there is shown an electric actuator, constructed in accordance with one embodiment of the present invention, generally designated by reference numeral 1. The electric actuator 1 comprises an axially extending, hollow cylindrical housing 2 having received in the axially opposite ends thereof a first housing end cap 3 with an 0-ring seal 3a and a second housing end cap 4 with an 0-ring seal 4a. The first housing end cap 3 has a flange portion 5 held against axial movement on an inner surface 2a of the housing 2 by means of an annular stop 5a received in an annular groove formed in the inner surface 2a of the housing 2, and a boss portion 6 axially forwardly extending from the flange portion 5. The second housing end cap 4 has a flange portion 7 held on the inner surface 2a of the housing 2, and a boss portion 8 axially rearwardly extending from the flange portion 7. The first and second housing end caps 3 and 4 are formed with axial bores 6a and 8a, respectively, which are held in axial alignment with each other. The housing 2 of the electric actuator 1 further has first and second hollow inner cylinders 9 and 10 secured on the boss portions 6 and 8 of the first and second housing end caps 3 and 4, respectively. Between the first and second inner cylinders 9 and 10 is clamped a radially inner end of a cylindrical permanent magnet 11 disposed within the housing 2 through magnetic screening rings 27 and 28 of non-magnetic material such as for example stainless steel, for the purpose of preventing a short circuit between the rings 27, 28 and the end faces of a cylindrical armature 13. The permanent magnet 11 is secured at its outer surface to the inner surface 2a of the housing 2 by suitable fastening means such as a bolt 12 passed through the housing 2. The permanent magnet 11 is formed with a central opening 11a within which the cylindrical armature 13 is axially movable between the boss portions 6 and 8 of the first and second housing end caps 3 and 4, and is magnetized so that the radially inner end thereof has one of magnetic poles and the radially outer end thereof has the other. One of the end faces of the permanent magnet 11 cooperates with the housing 2, first housing end cap 3, and first inner cylinder 9 to form a first coil chamber 14a in which a first actuating coil 14 is positioned. The other of the end faces of the permanent magnet 11 cooperates with the housing 2, second housing end cap 4, and second inner cylinder 10 to form a second coil chamber 15a in which a second actuating coil 15 is positioned. The first and second actuating coils 14 and 15 are supported by the housing 2.

An axially movable valve actuating rod 16 is fixedly connected to the armature 13 disposed between the first and second housing end caps 3 and 4. The valve actuating rod 16 has an intermediate portion 16b fixedly connected to the armature 13, a rear portion 16a axially rearwardly extending from the intermediate portion 16b into the axial bore 6a formed in the first housing end cap 3 and terminating in its rear end having a first spring stop 17 thereon, and a front portion 16c axially forwardly extending from the intermediate portion 16b into the axial bore 8a formed in the second housing end cap 4 and terminating in its front end having a second spring stop 18 thereon. A first spring 19 is interposed between the first spring stop 17 and a step portion 6b formed in the axial bore 6a of the first housing end cap 3. Likewise, a second spring 20 is interposed between the second spring stop 18 and a step portion 8b formed in the axial bore 8a of the second housing end cap 4. These springs 19 and 20 function to hold the armature 13 and the valve actuating rod 16 at their neutral positions. To the front end of the valve actuating rod 16 is connected a valve spool 22 of a hydraulic valve assembly generally designated by reference numeral 21. As a consequence, the valve spool 22 is caused to move in axial opposite directions by the axial movement of the valve actuating rod 16 which is caused to axially move through the armature 13 by the permanent magnet 11 and the actuating coils 14, 15 when the ends of the latter is connected to electrical equipment to form a circuit.

Figure 2:
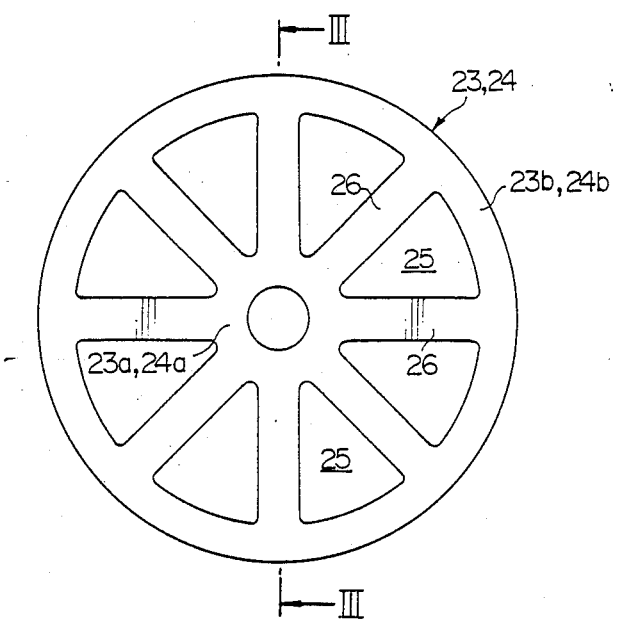
FIG. 2 is a front view of a support member formed in the electric actuator shown in FIG. 1.
Figure 3:
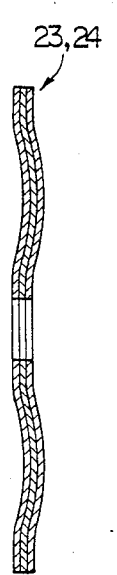
FIG. 3 is a cross sectional view of the support member substantially taken along line III—III indicated in FIG. 2.

In FIGS. 1, 2 and 3, the electric actuator 1 according to the present invention further comprises a pair of first and second elastic support members generally designated by reference numerals 23 and 24, respectively. Each of the elastic support members 23 and 24 is formed with a plurality of arm portions 26 equiangularly spaced apart with respect to one another and a plurality of generally triangular openings 25 each disposed between two adjacent arm portions 26. The first elastic support member 23 is connected at its radially inner end 23a to one end of the intermediate portion 16b of the valve actuating rod 16 and at its radially outer end 23b to the first inner cylinder 9, while the second elastic support member 24 is secured at its radially inner end 24a to the other end of the intermediate portion 16b of the valve actuating rod 16 and at its radially outer end 24b to the second inner cylinder 10. Thus, the armature 13 and the valve actuating rod 16 are concentrically held with respect to the permanent magnet 11. The valve actuating rod 16 is supported at opposite portions thereof adjacent the armature 13 by the elastic support members 23 and 24. As shown in FIG. 3, the arm portions 26 of the elastic support member 23 are deflected with respect to the radially inner and outer end portions 23a and 23b of the elastic support member 23 so that the valve actuating rod 16 is readily axially movable when caused to move by the first and second actuating coils 14 and 15 and permanent magnet 11. Likewise, the arm portions 26 of the elastic support member 24 are deflected with respect to the radially inner and outer end portions 24a and 24b of the elastic support member 23. The elastic support members 23 and 24 each consist of a plurality of thin leaves laminated one upon the other. For this arrangement, the spring constant of each of the elastic support members 23 and 24 is decreased, so that the elastic support members 23 and 24 are axially movable by smaller force.

The operation of the electric actuator 1 constructed in accordance with one embodiment of the present invention will hereinafter be described.

When the first and second actuating coils 14 and 15 are not connected to electrical equipment (not shown), the armature 13 and valve actuating rod 16 are held at their neutral positions by the springs 19 and 20 as shown in FIG. 1, and is also concentrically held with respect to the permanent magnet 11 by the elastic support members 23 and 24. It is assumed that the magnetic lines of force generated by the radially inner end of the permanent magnet 11 pass in a first direction through the armature 13, the boss portion 6 and flange portion 5 of the first housing end cap 3, hosing 2 and return to the radially outer end of the permanent magnet 11. At the same time, the magnetic lines of force generated by the radially inner end of the permanent magnet 11 pass in a second direction opposite to the first direction through the armature 13, the boss portion 8 and flange portion 7 of the second housing end cap 4, housing 2 and return to the radially outer end of the permanent magnet 11. In this instance, when the first and second actuating coils 14 and 15 are connected to the electrical equipment so that the magnetic lines of force generated by the actuating coils 14 and 15 pass in the same direction, for example, in the second direction through the armature 13, the boss portion 8, the flange portion 7, the housing 2, the flange portion 5, and the boss portion 6. As a consequence, the magnetic lines of force at the boss portion 6 of the first housing end cap 3 decrease in intensity, while the magnetic lines of force at the boss portion 8 of the second housing end cap 4 increases in intensity. This difference in the intensity causes the armature 13 to move against the spring 20 toward the boss portion 8 of the second housing end cap 4 until the force acting on the armature 13 is equilibrated with the spring force. The movement of the armature 13 is transmitted through the valve actuating rod 16 to the valve spool 22 of the hydraulic valve assembly. In this instance, the elastic support members 23 and 24 elastically deforms so that the armature 13 is concentrically held with respect to the permanent magnet 11 and prevented from coming into contact with the permanent magnet 11. Thus, there is no friction between the armature 13 and the permanent magnet 11. Therefore, even if the radial force is exerted upon the armature 13, an operating responsiveness of the armature 13 will not be reduced and a large energy loss will not occur. Further, since bearings are not employed for supporting the valve actuating rod 16, the valve actuating rod 16 according to the present invention is not locked and the mechanical hysteresis is not increased by such foreign substance caught in the bearings of the aforementioned prior art actuator. Furthermore, even if the valve actuating rod 16 is subjected to a radial force, the rod 16 is not substantially bent because the valve actuating rod 16 is supported at the opposite portions thereof adjacent the armature 13 by the support members 23 and 24. For this reason, the valve actuating rod is not twisted while moving.

From the foregoing description, it will be seen that an improved electric actuator which can overcome the drawbacks inherent in the prior art is afforded by the present design.

While a certain representative embodiment and details have been shown for the purpose of illustrating the invention, it will be apparent to those skilled in this art that various changes and modifications may be made therein without departing from the spirit or scope of the invention.

What is claimed is:

1. An electric actuator comprising
a housing,
a permanent magnet disposed within said housing,
an axially movable armature disposed within said housing,
an actuating coil supported by said housing for driving said armature to axially move, and
an axially moveable actuating rod fixedly connected to said armature, wherein said electric actuator further comprises
a pair of elastic support members having radially inner end portions fixedly connected to said actuating rod at opposite portions thereof adjacent said armature and radially outer end portions fixedly connected to said housing, respectively, each of said elastic support members consisting of a plurality of thin leaves laminated one upon the other, each of said elastic support members being formed with a plurality of arm portions equiangularly spaced apart with respect to one another and radially extending between said radially inner and outer end portions and a plurality of generally triangular openings each disposed between two adjacent arm portions, each of said arm portions being axially deflected with respect to said radially inner and outer end portions of said elastic support member.

* * * * *